March 14, 1933.  J. M. WILLIS  1,901,788
LAWN TRIMMER
Filed Dec. 14, 1932
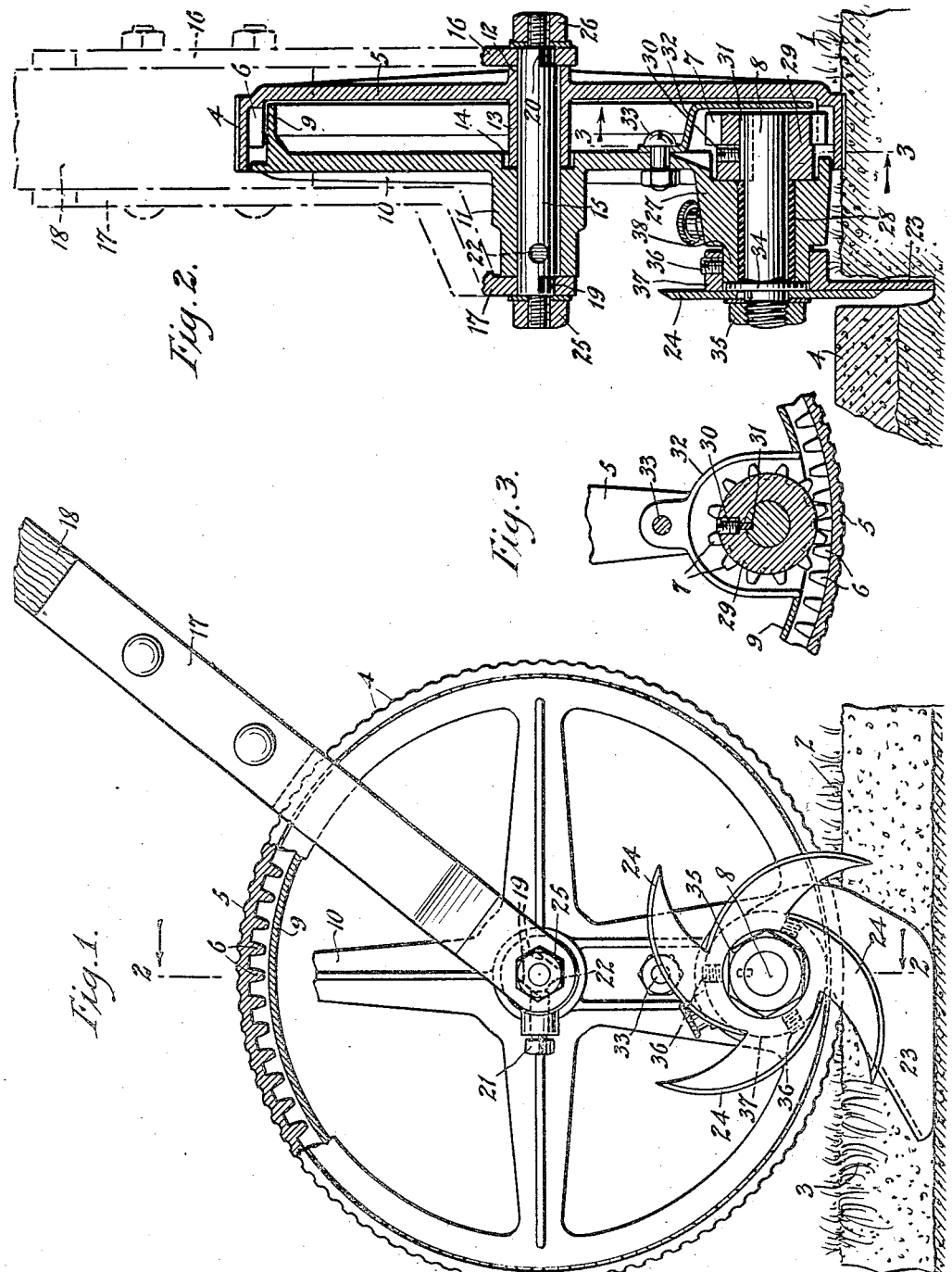
INVENTOR
James M. Willis
BY
ATTORNEY Patented Mar. 14, 1933

1,901,788

UNITED STATES PATENT OFFICE

JAMES M. WILLIS, OF SCOTIA, NEW YORK

LAWN TRIMMER

Application filed December 14, 1932. Serial No. 647,271.

This invention relates to a lawn trimmer, and has for an object to provide an improved construction which may be used to trim the edges of a lawn adjacent the walks or other places without previous preparation of the lawn or edge.

Another object of the invention is to provide a lawn trimmer wherein a stationary and a movable trimming element are used to provide a shearing action when trimming the grass or other matter adjacent the edge of a lawn so as to give a finished appearance to the lawn.

A further object, more specifically, is to provide a lawn trimmer with a handle, trimming elements and means for transmitting power from the handle to the trimming elements in such a way that the triming elements will function to force the device over the ground by the handle.

A still further object of the invention is to provide a lawn trimmer having a stationary shearing structure and a movable shearing structure, together with means to move the structures along, the formation of the means for moving the structure being such that the respective shearing members may be adjusted at any time to secure the proper shearing action.

In the accompanying drawing—

Figure 1 is a side view of a lawn trimmer disclosing an embodiment of the invention, part of the structure being shown in section and the device being shown in connection with the edge of a lawn;

Figure 2 is a sectional view through Figure 1 approximately on the line 2—2;

Figure 3 is a detailed fragmentary sectional view through Figure 2 on the line 3—3.

Referring to the accompanying drawing by numerals, 1 indicates a lawn having an edge 2 over which grass or other matter 3 protrudes. Adjacent the edge 2 a pavement or other walk 4 may be located and in the ordinary growth of the grass the overhanging portion 3 would naturally overhang the walk or pavement. The trimmer embodying the invention and illustrated in Figures 2 and 3, acts to trim the edge 2 adjacent the walk 4 so as to produce a neat appearance both to the walk and the lawn.

The trimmer itself is formed with a ground wheel 5 having an internal gear 6 continually meshing with the pinion 7 which is keyed to the shaft 8 so as to rotate the shaft 8 as the ground wheel 5 moves over the ground.

A covering plate 9 is provided which fits into the ground wheel 5, as shown in Figure 2, said covering plate being provided preferably with integral bracing arms 10, said bracing arms merging into the hub 11, as shown in Figure 2. The ground wheel 5 is provided with a hub having an outwardly extending section 12 and an inwardly extending section 13 projecting loosely into the socket 14 in hub 11. The hub just described accommodates a shaft 15 which extends through the lower ends of bars 16 and 17 and is rigidly secured to the handle 18, which handle may be of any desired shape and size.

As shown in Figure 2, shaft 15 is provided with flattened portions 19 and 20, said flattened portions fitting into similar shaped apertures in the bars 16 and 17. A set screw 21 extends through hub 11 and into a suitable socket 22 formed in the shaft 15 for locking the shaft to the hub 11, thus determining the angle at which the handle 18 is to be positioned when the cutters 23 and 24 are in proper functioning position. Suitable nuts 25 and 26 clamp the bars 16 and 17 firmly in place, though this clamping action does not press the extension 13 against the hub 11. In this way the ground wheel 5 is allowed to rotate freely while the hub 11 and the parts connected therewith are held in a certain position by the handle 18.

At the lower part of the covering plate 9 there is an integral enlargement 27 which accommodates the shaft 8, which shaft extends ordinarily through the enlargement and operates within a bearing sleeve 28 of suitable material, as, for instance, brass. Pinion 7 is provided with an extension 29 which accommodates the set screw 30, which set screw presses tightly on the key 31 for locking the parts together. A protecting apron 32 is clamped in place by the bolt 33 so as to protect the pinion 7 and associated parts against accidental entrance of dirt and the like. At the outer end of shaft 8 an integral flange 34 is provided which normally bears against the enlargement 38, and against which the blade 24 presses. A suitable nut 35 is screwed on to the threaded end of shaft 8 and presses the blade 24 tightly against flange 34 and also holds it against the combined guide and blade 23 which is held in place by a plurality of set screws 36 extending through the flange 37 from bracing against the reduced end 38 of enlargement 27.

If there should be any wear between the two blades, a proper adjustment of the screw 36 will take care of such wear and keep the blades maintained in proper shearing position. Also, if desired, pinion 7 and extension 29 may be shifted longitudinally of shaft 8 by proper movement of the parts and after loosening the set screw 30. Normally the parts are in the position shown in Figures 1 and 2 with the handle 18 set at a desired angle whereby a movement thereof will push the device along over the ground. The periphery 4 of the wheel is roughened in any desired manner so as to grip the ground, and as the device is moved along the blade 23 will act as a guide and also as a shearing blade for coacting with the blade 24 which is preferably provided with four blade extensions, as shown in Figure 1. It will be understood that not only is the grass cut by the blades, but if there are other overhanging portions of sod or even earth, these also are trimmed away and a desired smooth edge given to the lawn.

I claim:—

1. A lawn trimmer comprising a ground wheel, a covering plate projecting into the ground wheel, a handle, means for rigidly securing the covering plate to the handle, means for rotatably mounting said wheel to rotate around said covering plate, said ground wheel having an internal gear, a pinion meshing with said gear, said covering plate having an apertured enlargement adjacent said pinion, a shaft extending through said enlargement, means for rigidly securing said shaft to said pinion, a stationary shearing blade rigidly clamped to said enlargement and a rotating shearing blade having a plurality of shearing extensions rigidly secured to said shaft and positioned to coact with the stationary shearing blade to produce a shearing action as the ground wheel and associated parts are moved along.

2. A lawn trimmer comprising a handle, a ground wheel, means for connecting the handle with the ground wheel so that as the handle is moved the ground wheel is caused to roll over the ground, a member supported by the handle, said member having an apertured enlargement, a shaft extending through said enlargement, a rotating toothed cutter carried by said shaft, a fixed cutter adjustably secured to said enlargement and positioned to coact with said toothed cutter to produce a shearing action, said ground wheel being provided with an internal gear and a pinion continually meshing with said gear rigidily secured to said shaft.

3. In a device of the character described, an adjustable cutter acting as a shearing member and a guide, a rotatable toothed cutter coacting with said combined cutter and guide, said cutter and guide being adjustable toward and from said rotatable toothed cutter, means for locking the cutter and guide in different adjusted positions and means for moving said cutter and guide over a given path and at the same time rotating said toothed cutter.

4. A lawn trimmer comprising a ground power wheel having an internal gear and a centrally positioned hub, a covering plate covering said gear and extending into said power wheel, said covering plate being formed with a hub having a passageway aligned with the passageway in the first mentioned hub, a shaft extending through both of said hubs, means for rigidly securing said shaft to the second mentioned hub, a handle rigidly secured to the ends of said shaft whereby as said handle is swung back and forth the covering plates and parts carried thereby will be swung, said covering plate having an enlargement at the lowest point when the device is in operation, said enlargement having an opening therein, a shaft fitted into said opening, a gear wheel rigidly secured to the last mentioned shaft and continually meshing with the internal gear on said ground wheel, a toothed rotatable cutter rigidly secured to the last mentioned shaft, and a stationary cutter having an inclined cutting edge, said stationary cutter being adjustably secured to said enlargement and normally positioned to scrape against one face of said rotatable cutter.

JAMES M. WILLIS.